United States Patent [19]
Castel et al.

[11] Patent Number: 5,558,123
[45] Date of Patent: Sep. 24, 1996

[54] ELECTRICALLY CONTROLLED PRESSURE-HOLDING VALVE

[75] Inventors: Philippe Castel, Paris; Olivier Castello, Bondy; Guy Meynier, Aulnay-Sous-Bois, all of France

[73] Assignee: AlliedSignal Europe Services Techniques, Drancy, France

[21] Appl. No.: 513,059

[22] Filed: Aug. 9, 1995

[30]     Foreign Application Priority Data

Sep. 8, 1994 [FR] France ................... 94 10734

[51] Int. Cl.⁶ ............ B60T 15/36; B60K 41/24
[52] U.S. Cl. ............ 137/598; 188/353; 192/13 A; 251/129.02; 477/198
[58] Field of Search ............ 137/598; 188/353; 192/13 A; 251/129.02; 477/198

[56]         References Cited

U.S. PATENT DOCUMENTS

| | | | |
|---|---|---|---|
| 2,596,779 | 5/1952 | McCoy | 137/598 |
| 3,759,293 | 9/1973 | Tanaka. | |
| 4,658,942 | 4/1987 | Kubota et al. | 137/598 X |
| 4,802,563 | 2/1989 | Kojima et al. | 137/598 X |
| 5,316,378 | 5/1994 | Maehara | 188/353 X |

FOREIGN PATENT DOCUMENTS

| | | |
|---|---|---|
| 2534209 | 12/1982 | France. |
| 58-105867 | 12/1981 | Japan. |

*Primary Examiner*—Gerald A. Michalsky
*Attorney, Agent, or Firm*—Leo H. McCormick, Jr.

[57]             ABSTRACT

A pressure-holding valve for a brake system having a body with a blind bore therein. The body has a first passage which connects the blind bore with a variable pressure inlet port and a pressure outlet port. The blind bore is closed by seals carried on a plug having an axial passage therein connecting said inlet port with a second passage connected to the first passage. A non-return valve is located in said blind bore between the plug and the bottom of the blind bore while a valve controlled by an electromagnet is locate in the plug. In response to an operational signal the valve controlled by the electromagnet is moved into engagement with a seat to interrupt communication between the inlet port and the first passage. If the pressure holding valve is on an incline plane, the non-return valve moves to close the axial passage to prevent the return of pressurised fluid from the outlet port toward the inlet port and thereby maintain the fluid pressure in the system at a value of the fluid pressure at the outlet port to sustain a brake application.

3 Claims, 1 Drawing Sheet

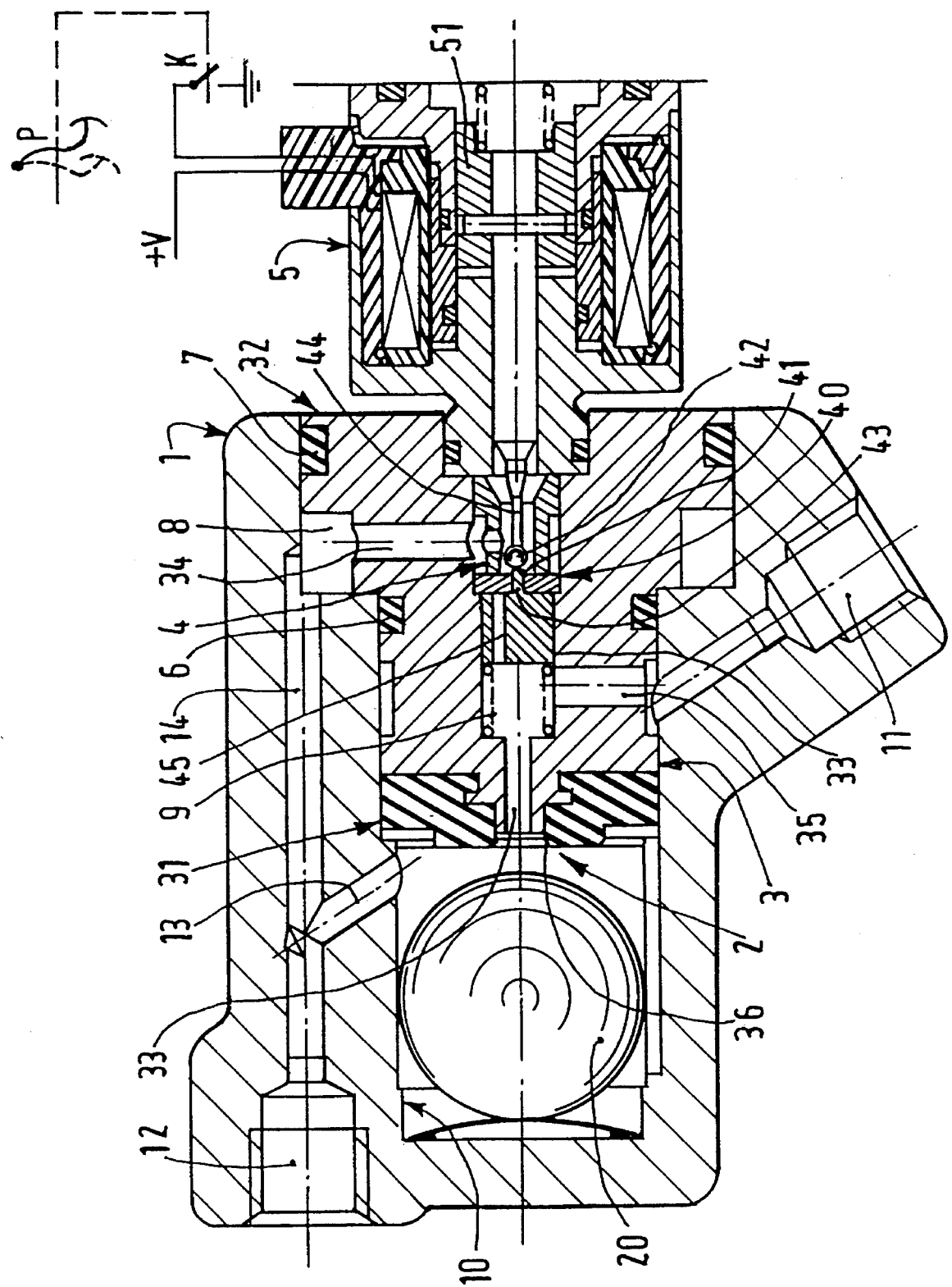

ELECTRICALLY CONTROLLED PRESSURE-HOLDING VALVE

The present invention relates to a pressure-holding valve, comprising a body pierced with a variable-pressure inlet and with a pressure outlet, a non-return valve housed within the body, interposed between the inlet and the outlet, and establishing between these a first communication pointing in a direction going from this inlet towards this outlet, and a controlled valve, installed inside the body on a bypass path bypassing the non-return valve in order to allow, selectively, a second communication to be established or broken between the inlet and the outlet, this valve being made to close by an electromagnet integral with the body, and made to open via a return spring acting against this electromagnet.

A valve of this type has already been proposed in the prior art, as illustrated, for example, by documents FR-A-2,534,209 or U.S. Pat. No. 4,515,259, in particular for its application in hydraulic braking circuits, allowing motor vehicles which they equip to be held on an incline.

In reality, since braking systems are produced in very large numbers and affect public safety, any component of these systems must be able to be manufactured at low cost and nevertheless exhibit incontestable reliability.

Within this context, the object of the present invention is to propose a valve which is at least as reliable as the one described in the prior art, and the production of which is, however, considerably simpler.

To this end, the valve of the invention, which moreover conforms to the definition thereof given previously, is essentially characterized in that the body is formed as a single unit and pierced with a blind bore closed by two annular seals carried by a plug, a first end of which is engaged in this blind bore, in that the non-return valve is formed between the closed end of the blind bore and the first end of the plug, in that the electromagnet is rendered integral with a second end of the plug, on the outside of the blind bore, in that the outlet communicates with an annular volume defined between the two annular seals, and in that the plug is pierced with a first passage causing the inlet of the valve to communicate with the non-return valve, and with a second passage causing the inlet to communicate with the annular volume, the controlled valve being installed on this second passage.

According to a preferred embodiment of the invention, the first and second passages are partially defined by an axial drilling formed in the plug and in the extension of which the electromagnet is mounted.

Moreover, the non-return valve, in the main application of the valve of the invention, is essentially made up of a ball housed in the closed end of the blind bore and of a seat defined around the region where the axial drilling emerges into the first end of the plug, the ball closing off this seat by means of gravity.

Other features and advantages of the invention will emerge clearly from the description thereof which is given hereafter, by way of non-limiting indication, with reference to the appended drawing of which the single FIGURE is a sectional view of a valve in accordance with the invention, represented in the position of rest of the electromagnet.

As this figure shows, this pressure-holding valve essentially comprises a body 1 formed as a single unit and pierced with a blind bore 10, a non-return valve 2 housed within the closed end of the blind bore 10, a plug 3 having a first end 31 of which is engaged in the blind bore 10, a controlled valve 4, and an electromagnet 5 mounted axially on the second end 32 of the plug 3 outside of the blind bore and controlling the controlled valve 4.

The body 1 is also pierced with a variable-pressure inlet 11 and with a pressure outlet 12, the non-return valve 2 being interposed between pressure inlet 11 and pressure outlet 12 by virtue of at least one passage 13, and establishing between pressure inlet 11 and pressure outlet 12 a first communication pointing in a direction going from the pressure inlet 11 towards pressure 12.

The plug 3 has an axial drilling or bore 33 passing through it and, in the vicinity of its second end 32, carries two annular seals 6, 7 which are axially spaced from one another, closing off the blind bore 10 of body 1 and delimiting, between the plug 3 and the bore 10, an annular volume 8 which is connected to the pressure outlet 12 via a duct or passage 14.

The controlled valve 4 is housed within the plug 3, and installed on a bypass path which bypasses the non-return valve 2 and which, apart from the duct or passage 14, comprises a radial duct or passage 34 drilled into plug 3 and communicating with the annular volume 8, part of the axial drilling or passage 33, and another radial duct 35 drilled into the plug 3 and communicating with the inlet 11.

Radial duct or bore 35 defines, together with that part of the axial drilling or passage 33 which emerges into the first end 31 of the plug 3, a passage causing the inlet 11 of the valve to communicate with the non-return valve 2. Valve 2 is essentially made up of a ball 20 housed in the closed end of the blind bore 10 and of a seat 36 formed on the end of plug 3 adjacent passage the axial drilling 33.

The controlled valve 4 comprises a disc 40 closing off the axial drilling or passage 33 and itself offering a seat 41 to a shut-off member 42, for example a spherical one, the position of which is determined as a function of the positions of two needles 43 and 44.

The needle 43 is carried by a hollow piston 45 and urged by a return spring 9 in a direction capable of moving the shut-off member 42 off its seat 41, while the needle 44 is carried by the core plunger 51 of the electromagnet 5.

The operation of this valve, used for example in the braking circuit of a vehicle, is as follows.

The electrical supply to the electromagnet 5 is controlled by an electric contact K integral with the clutch pedal P of the vehicle, this electromagnet 5 being energized only when the pedal P is actuated.

When the electromagnet 5 is energized, the needle 44 is urged towards the left of the figure by the core plunger 51, and the shut-off member 42 is applied in leaktight fashion to the seat 41 while the needle 43 is being pushed back to the left to counter to the force exerted by the spring 9.

If a braking pressure is applied to the input 11, this pressure is transmitted to the outlet 12 of the valve via the duct 35, drilling or passage 33, the seat 36 and the duct or passage 13.

If, however, the vehicle is on a slope at this time, the ball 20 is applied to the seat 36 and the pressure on the outlet 12 is then trapped by the non-return valve which the ball 20 and the seat 36 together constitute, even after the pressure on the input 11 is released.

As the pressure in the brakes is maintained, the vehicle is held on the slope.

However, as soon as the driver releases the clutch pedal P in order to cause the vehicle to move, the electromagnet 5 ceases to be energized, and the hydraulic fluid present on the outlet 12 is recycled to the input 11, now at low pressure, through the duct or passage 14 and 34, the open valve 4, the axial drilling or passage 33 and the duct or passage 35.

We claim:

1. A pressure-holding valve, comprising a body having a blind bore therein with a variable-pressure inlet port and with a pressure outlet port, a non-return valve housed within the body and interposed within said bore between said inlet port and outlet port, a first passageway for establishing a first communication path between said inlet port and outlet port, said communication path pointing in a direction going from said inlet port towards said outlet port, and a controlled valve located in said body on a bypass path bypassing the non-return valve in order to allow, selectively, a second communication to be established or broken between the inlet port and the outlet port, said controlled valve being closed in response to actuation of an electromagnet integral with the body and opened by a return spring acting on said electromagnet, characterised in that said body is formed as a single unit and pierced to form said blind bore, said blind bore being is closed by two annular seals carried by a plug, said plug having a first end of which engages said blind bore, said non-return valve being located between the closed end of the blind bore and said first end of the plug and said electromagnet is rendered integral with a second end of the plug and located outside of said blind bore, said outlet port communicating with an annular volume defined between said two annular seals and said plug being pierced with a first passage permitting said inlet port of said valve to communicate with said non-return valve and with a second passage causing the inlet port to communicate with said annular volume, said controlled valve being installed in said second passage.

2. The pressure-holding valve according to claim 1, characterized in that said first and second passages are partially defined by an axial passage formed in said plug and said electromagnet is mounted in prolongation of said axial passage.

3. The pressure-holding valve according to claims 2, characterized in that said non-return valve includes a ball housed in the closed end of said blind bore and a seat defined around the region where said axial passage emerges into a first end of said plug, said ball responding to gravity by moving to close said seat and thereafter preventing communication through said axial passage from said outlet port.

* * * * *